Figure 1:
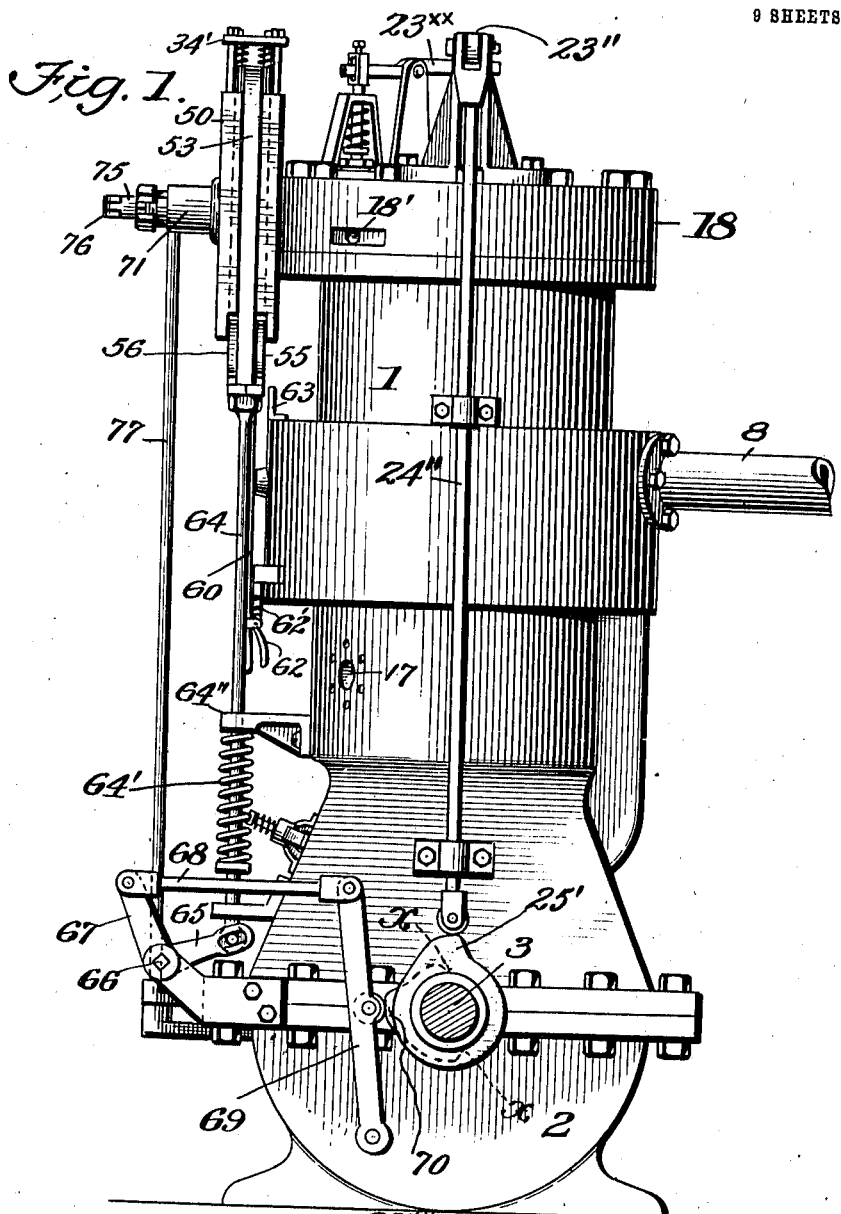

S. LAKE.
INTERNAL COMBUSTION ENGINE.
APPLICATION FILED MAR. 21, 1911.

1,026,871.

Patented May 21, 1912.
9 SHEETS—SHEET 1.

Witnesses
J. E. Lake
M. J. Bloudel

Inventor
Simon Lake.
by Wm. W. Finckel
Attorney

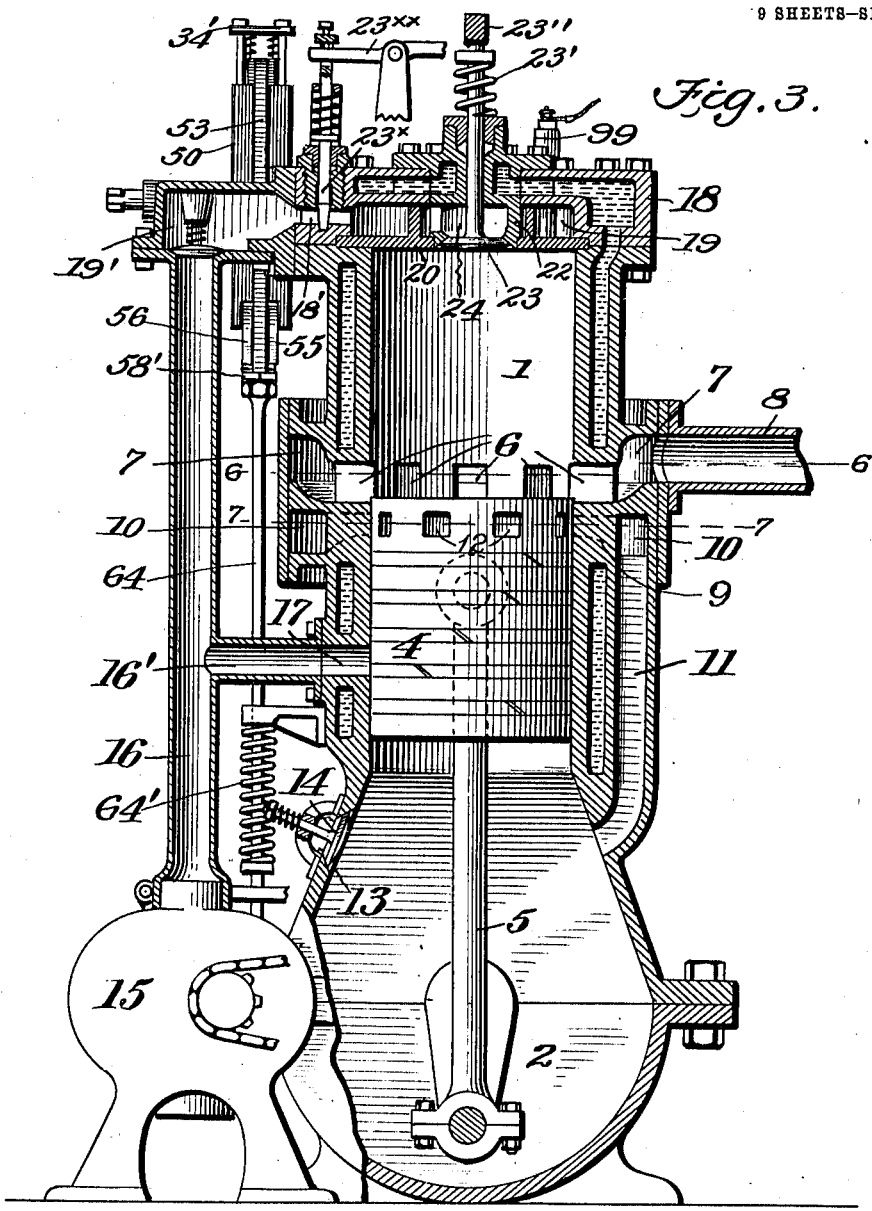

S. LAKE.
INTERNAL COMBUSTION ENGINE.
APPLICATION FILED MAR. 21, 1911.
1,026,871.
Patented May 21, 1912.
9 SHEETS—SHEET 3.
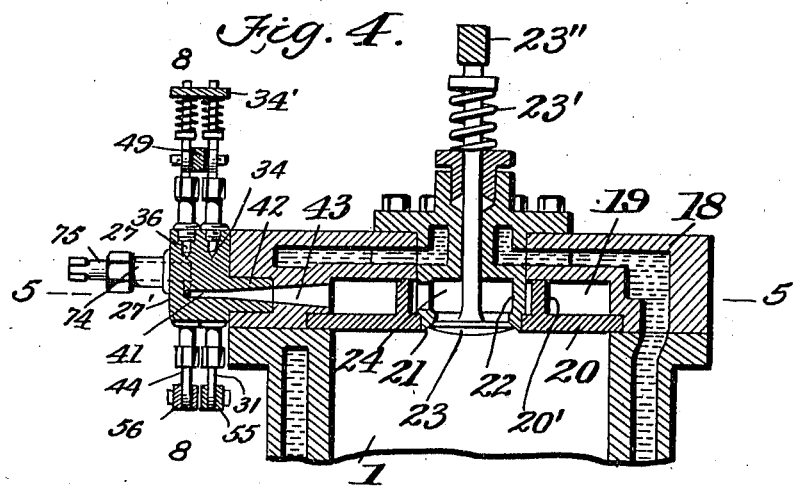
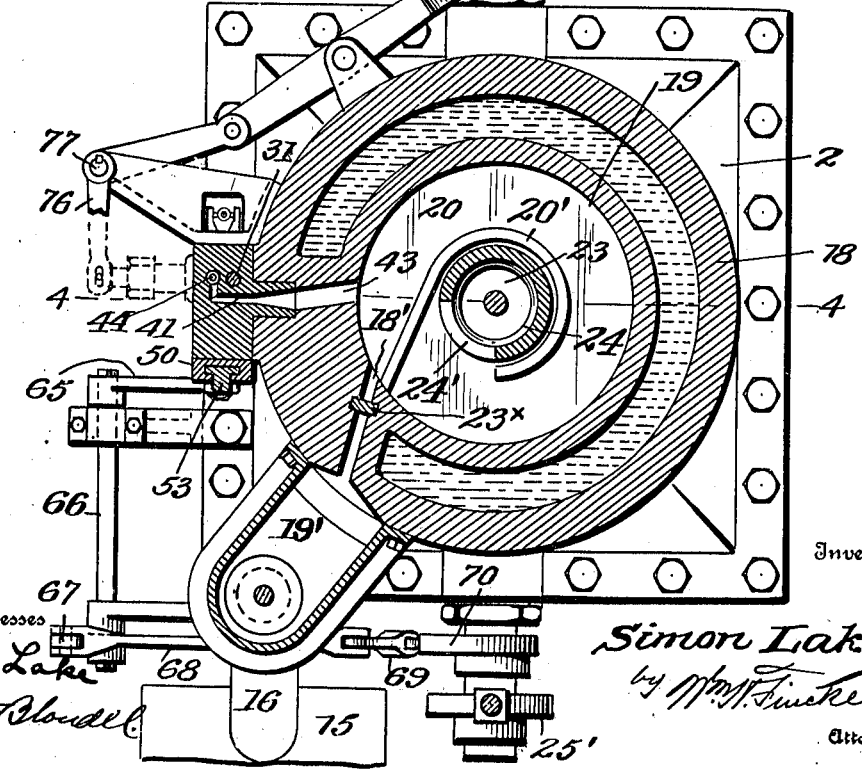

S. LAKE.
INTERNAL COMBUSTION ENGINE.
APPLICATION FILED MAR. 21, 1911.

1,026,871.

Patented May 21, 1912.

9 SHEETS—SHEET 4.

Witnesses
J. E. Lake
Mod Blondel

Inventor
Simon Lake
by W. H. Fincel
Attorney

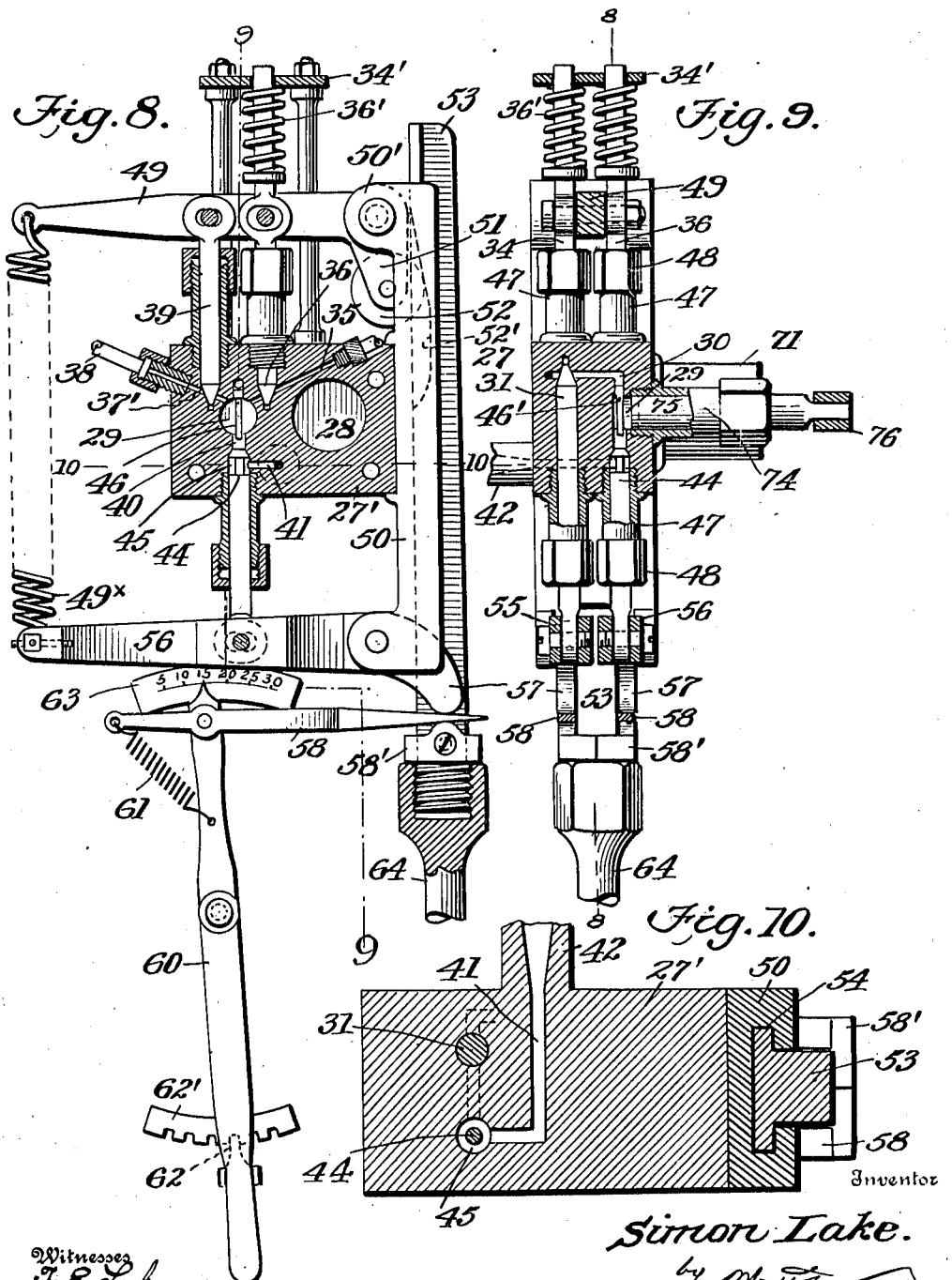

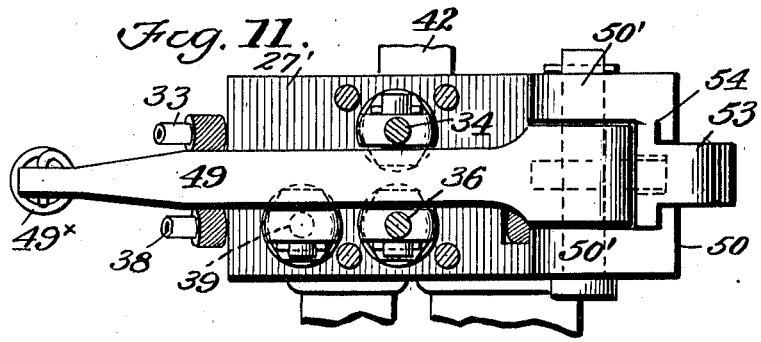
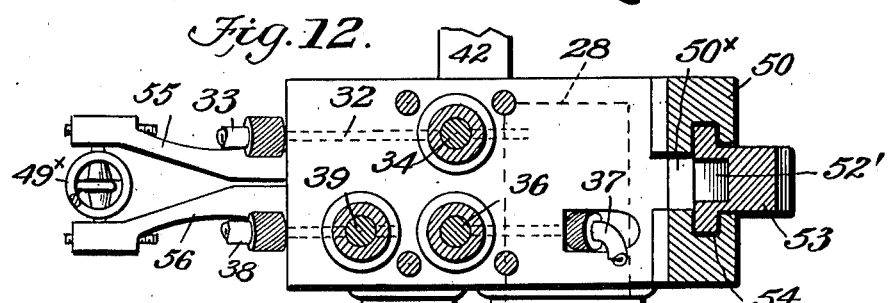
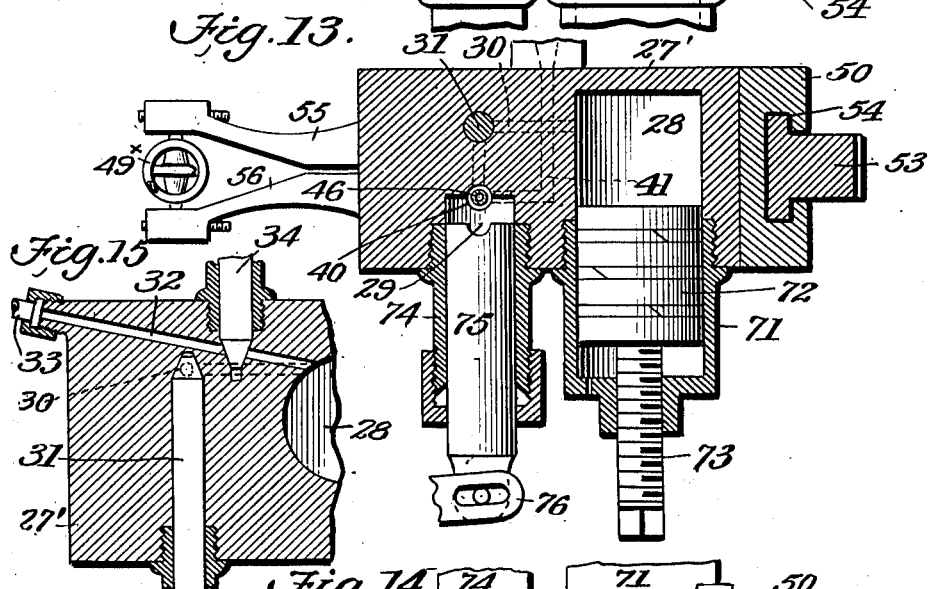
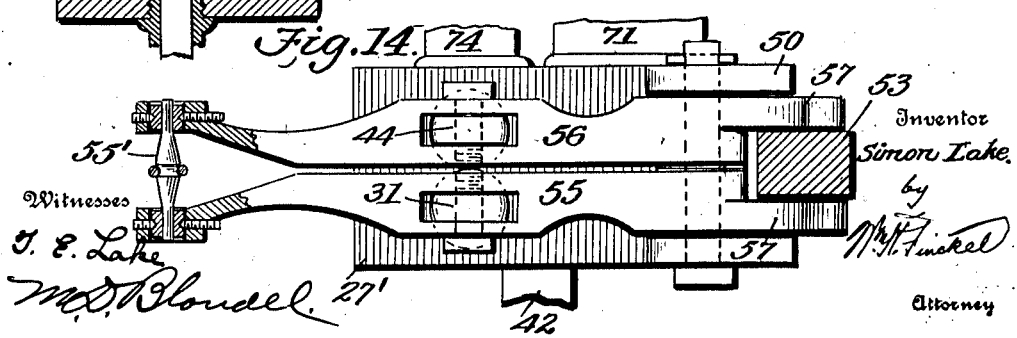

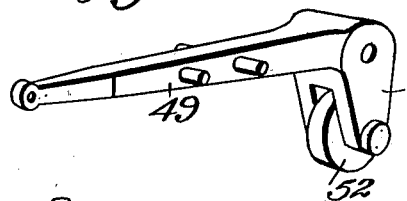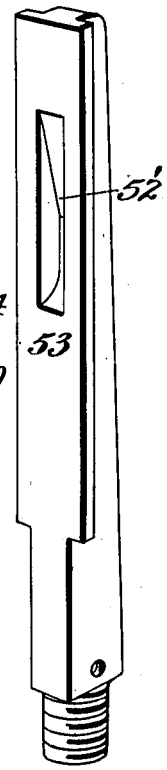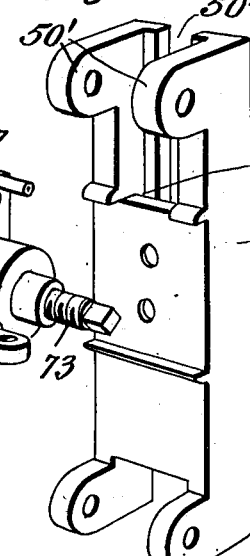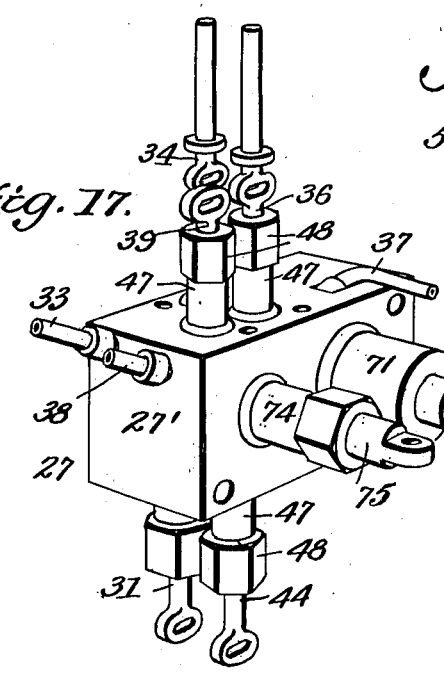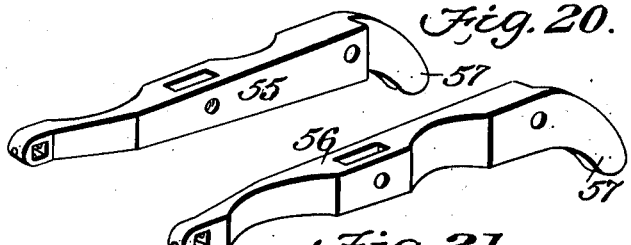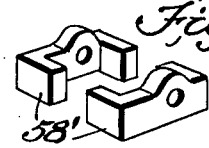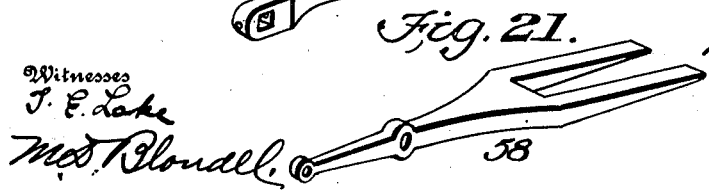

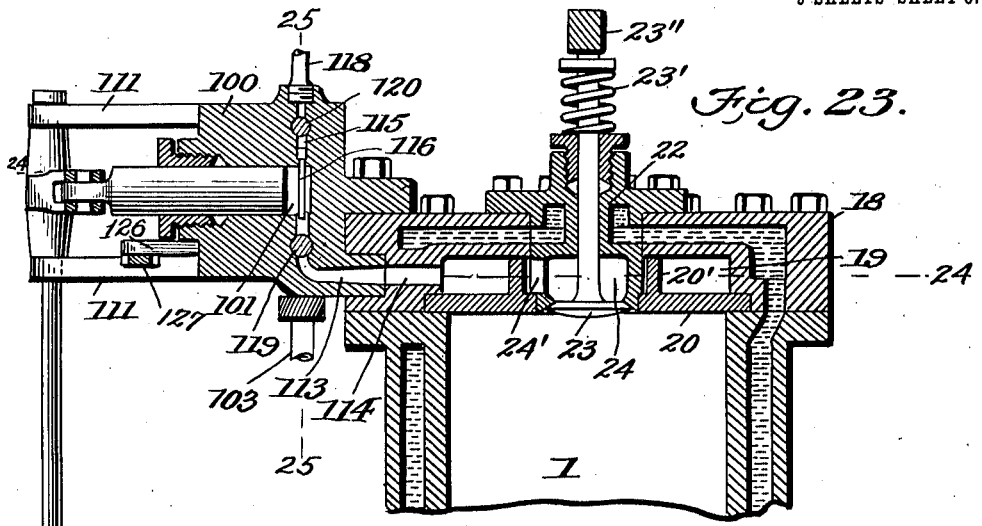
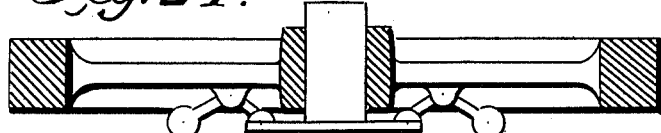
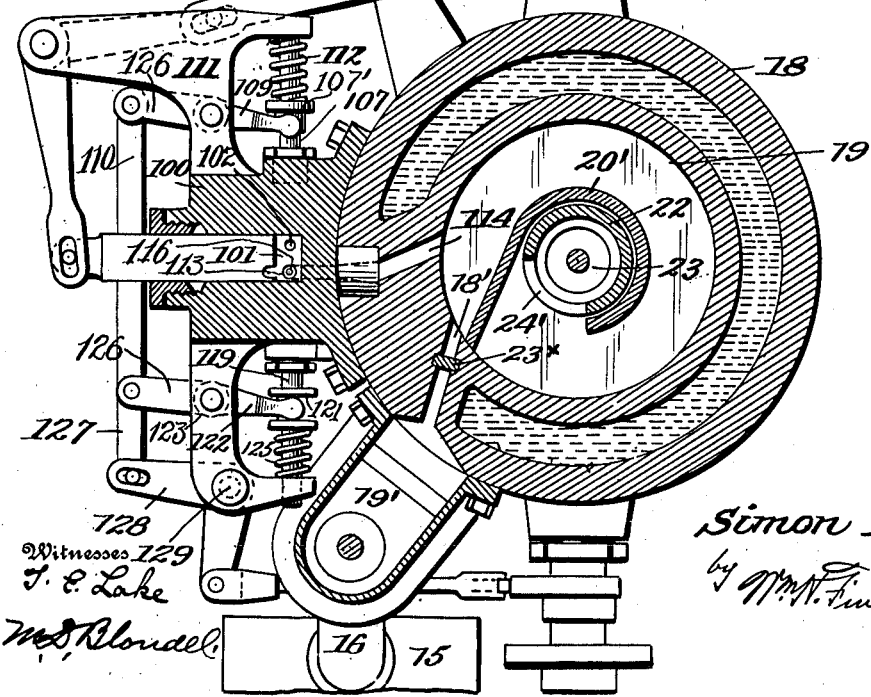

S. LAKE.
INTERNAL COMBUSTION ENGINE.
APPLICATION FILED MAR. 21, 1911.
1,026,871.
Patented May 21, 1912.
9 SHEETS—SHEET 9.
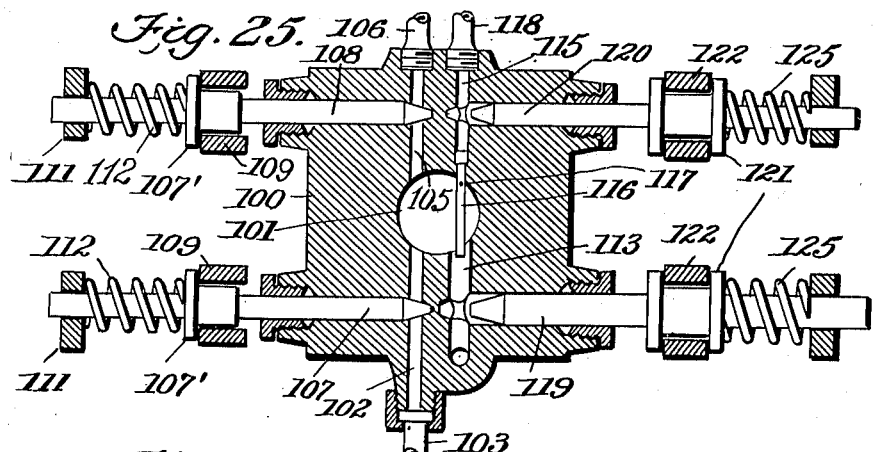
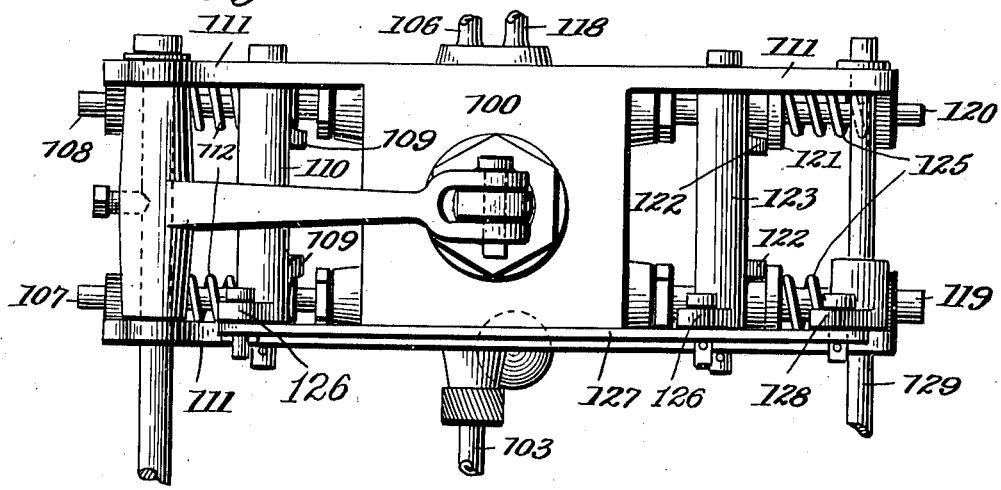
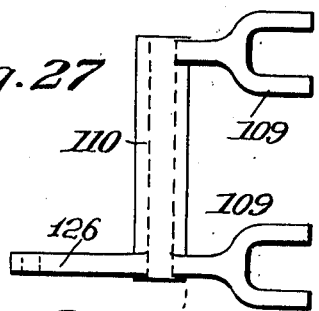
Witnesses
T. E. Lake
M. D. Blondel
Inventor
Simon Lake
by Wm N. Finckel
Attorney

UNITED STATES PATENT OFFICE.

SIMON LAKE, OF MILFORD, CONNECTICUT.

INTERNAL-COMBUSTION ENGINE.

1,026,871.  Specification of Letters Patent.  Patented May 21, 1912.

Application filed March 21, 1911. Serial No. 615,992.

*To all whom it may concern:*

Be it known that I, SIMON LAKE, a citizen of the United States, residing at Milford, in the county of New Haven and State of Connecticut, have invented certain new and useful Improvements in Internal-Combustion Engines, of which the following is a specification.

One of the important elements of a successfully operating internal combustion engine is provision for a complete scavenging of the power cylinder of the products of combustion after each stroke of the piston. As is well known the two-cycle engine is not as economical of fuel as the four-cycle engine owing to the more imperfect scavenging of the cylinders of the two-cycle type. I have found in my experimental work with the two-cycle engine that it is an advantage to have a greater quantity of scavenging air than it is possible to obtain by the constructions of this type of engines now in common use where the lower end of the power piston acts as a compression piston to draw a quantity of air into the base of the engine, there compress it and finally allow the compressed air to escape into the power end of the cylinder the moment of or immediately after the opening of the exhaust so as to drive out the products of combustion and to recharge the cylinder with fresh air for mixture with the gas injected into the cylinder to form the combustible charge. Unless the cylinder is thoroughly scavenged the following charges will not explode at the proper time, and hence the engine will miss firing and "back fire," thereby resulting in a loss of fuel. I have also found it possible to use heavy low grade oils in low pressure engines by providing for a thorough mixing of the oil with a certain quantity of fresh compressed air and the conversion of the oil and the air into a rich gaseous mixture before being admitted into the power cylinder by injecting the oil in a finely divided state into a hot furnace or upon a hot plate by and along with a certain quantity of compressed air, where the oil is heated and the vapors therefrom are mixed with the air and thus converted into a rich gaseous mixture that is, in turn, converted into a combustible mixture with the air in the cylinder when the mixture is compressed to a sufficient degree by the power piston working in the cylinder.

The invention has for its object to provide for a thorough scavenging of the power cylinder of the products of combustion; to provide a fuel mixing chamber or furnace in the power end of the power cylinder into which certain quantities of oil and air are injected and wherein the oil and the air are converted into a rich gas by the heat of the mixing chamber or furnace; to provide a fuel injector that is particularly adapted for the use of heavy oils and by which the oils in measured quantities are sprayed into the mixing chamber or furnace in a finely divided state; to provide means for injecting the rich gas into the power cylinder by an additional quantity of fresh air under pressure wherein the gas and the air are converted into an explosive gas which will be ignited by the heat of the mixing chamber or furnace and the compression of the gas and air by the piston when the latter reaches the end of its return stroke; and to provide means for regulating the quantities of oil and air injected into the mixing chamber or furnace and thus regulating the charge injected into the cylinder according to the speed at or load under which the engine is working.

With these objects in view the invention comprises certain novel features of construction and peculiar combinations and arrangements of parts as will be hereinafter fully described and then claimed.

Figure 2:
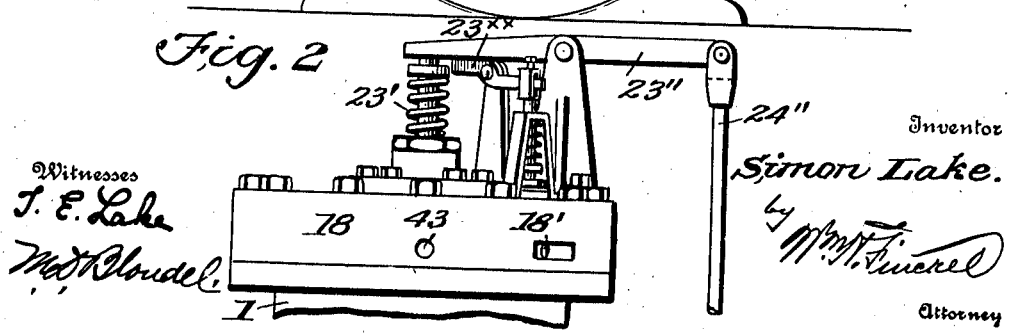
Figure 6:
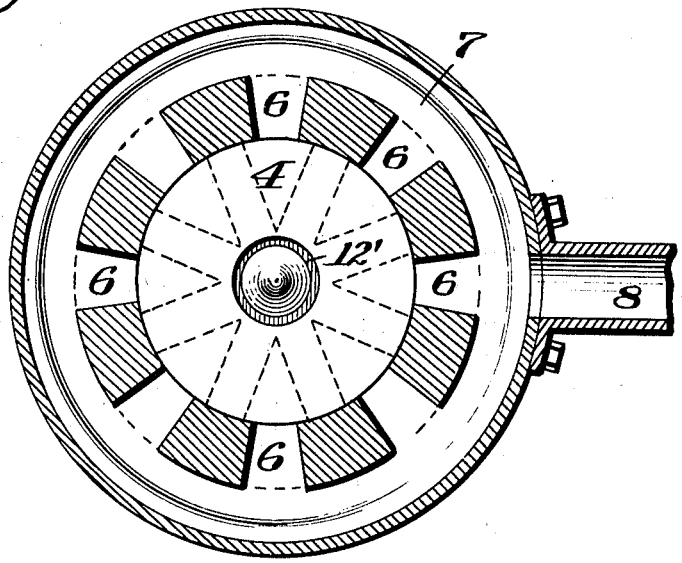
Figure 7:
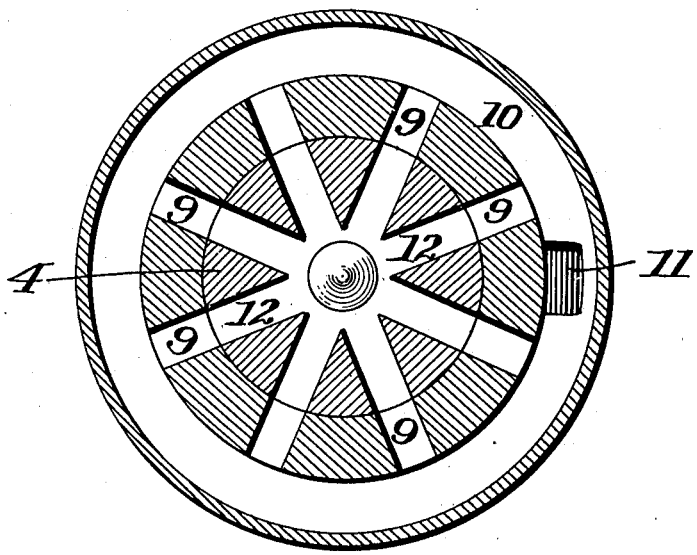

In the accompanying drawings, illustrating the invention, in the several figures of which like parts are similarly designated, Figure 1 is a side elevation of an engine embodying my improvements, the pump and its attachments for supplying air to the base of the engine and to the air chamber for the storage of the air used for injecting the fuel into the power cylinder being removed in order to clearly show the oil and air injector and its connections. Fig. 2 is a side elevation of the upper end of the power cylinder illustrating the lever for operating the valve controlling the communication between the mixing chamber or furnace and the power cylinder. Fig. 3 is a partial longitudinal section of the engine. Fig. 4 is a vertical section of the upper end of the power cylinder and the oil and air injector drawn on the line 4—4 of Fig. 5. Fig. 5 is a horizontal section drawn on the line 5—5 of Fig. 4. Fig. 6 is a horizontal section drawn on a slightly larger scale through the exhaust ports of the cylinder on the line 6—6 of Fig. 3. Fig. 7 is a similar view drawn through the air inlet ports on the line 7—7 of Fig. 3. Fig. 8 is a vertical section drawn through the oil and air injector on the line 8—8 of Fig. 9. Fig. 9 is a vertical transverse section drawn on the line 9—9 of Fig. 8. Fig. 10 is a horizontal section on a slightly larger scale drawn on the line 10—10 of Fig. 8. Fig. 11 is a sectional plan view of the oil and air injector. Fig. 12 is a similar view showing more clearly the location of the oil and the air inlet controlling valves and the oil overflow controlling valve. Fig. 13 is a horizontal section drawn through the air and the oil receiving chambers of the injector. Fig. 14 is an inverted plan view partly in section of the injector. Fig. 15 is a detail vertical section illustrating the valves for controlling the admission of air to the air receiving chamber of the injector and for controlling the escape of air from said chamber to the power cylinder of the engine. Fig. 16 is a perspective view of the lever that operates the oil inlet valve, the overflow valve and the air inlet valve. Fig. 17 is a perspective view of the base of the injector. Fig. 18 is a perspective view of the bracket to which the levers are pivoted. Fig. 19 is a perspective view of the sliding cam bar. Fig. 20 shows in perspective the levers for operating the valves controlling the admission of the oil and the air to the power cylinder. Fig. 21 is a perspective view of the wedge-shape arm against which the last mentioned levers engage. Fig. 22 is a perspective view of the contacting blocks carried by the cam bar. Fig. 23 is a vertical section of the upper end of the power cylinder illustrating a slightly different form of fuel injector. Fig. 24 is a horizontal section drawn on the line 24—24 of Fig. 23. Fig. 25 is a vertical transverse section on a slightly larger scale drawn through the fuel injector on the line 25—25 of Fig. 23. Fig. 26 is a face view of the form of injector shown in Figs. 23, 24 and 25. Fig. 27 is a side view of one of the valve operating levers. Fig. 28 is a plan view of same.

1 designates the water jacketed power cylinder of the engine mounted upon a suitable air-tight base 2 in which is journaled the crank shaft 3 that is connected to the piston 4 operating in the power cylinder by a connecting rod 5. In the side walls of the cylinder 1 are a series of exhaust ports 6 which are so located as to be uncovered by the piston when it reaches the end of its power stroke to permit the escape of the products of combustion from the cylinder. The exhaust ports lead into an annular exhaust chamber 7 formed upon the outer walls of the cylinder and has a pipe 8 connected thereto to carry off the combustion products. Immediately below the exhaust ports 6 and out of vertical alinement therewith, the walls of the cylinder are formed with a series of air inlet ports 9 which lead into the cylinder and extend from an annular air passage 10 formed upon the outer walls below the exhaust chamber 7 and which communicates with the interior of the base 2 through a passage 11. The air inlets 9 are designed to register with air passages 12 formed in the upper end of the piston 4 and extending inwardly toward the center of the piston and communicating with a centrally disposed opening 12' formed in the end of the piston and which communicates with the power end of the cylinder so that as the piston reaches the end of its power stroke the air that has been compressed in the base on said stroke will rush into the power end of the cylinder and drive out all of the remaining products of combustion that have been left in the cylinder after the exhaust ports were first opened thus thoroughly scavenging the cylinder before the next fuel charge is admitted. The base is provided with an air inlet opening 13 that is controlled by an inwardly opening valve 14.

In order to supply the base with a greater quantity of scavenging air than can be drawn in through the valve opening 13 through the upward movement of the piston 4 I propose to force air into the base by means of a suitable air pump 15 shown in the present illustration as a Root blower which I consider suitable for low compression engines but a suitable high pressure air pump may be used in connection with high pressure engines. As shown the pump 15 is operated by a chain and sprockets geared to the crank-shaft of the engine. The outlet of the pump opens into a pipe 16 having a branch 16' that extends to a port 17 arranged in the cylinder walls and which is so located that it will be closed by the power piston during the last quarter of its power stroke, thus allowing for a slight compression of the air that has been forced into the base by the pump 15 before the air inlet ports 9 have been uncovered thereby causing a considerable quantity of scavenging air to rush into the cylinder the moment said ports 9 are opened to thoroughly clean the cylinder before the exhaust ports are closed on the return stroke of piston. The upper end of the cylinder is closed by a water-jacketed head 18 in the under-side of which is formed a recess 19, preferably of the same diameter as the bore of the cylinder, which is cut-off from communication with said cylinder by means of a divisional plate 20 that is held between the upper end of the cylinder and the lower side of the rim of the head 18 thus providing a chamber which I shall hereinafter refer to as a mixing chamber or furnace. The plate 20 is formed with a central opening 21 in which is held the lower end of a valve casing 22 whose lower end is ground to provide a valve seat for an inwardly opening spring seated valve 23. The stem of the valve extends upwardly through the valve casing and has its outer end surrounded by a spring 23' that is held between the top of the stuffing box surrounding the valve stem and a collar held on said stem so as to normally hold the valve 23 up against its seat. The lower end of the valve casing is formed with a recess 24 which communicates with the chamber 19 through an opening 24' formed in the wall of the casing and the plate 20 is formed with an upwardly extending rib 20' that starts from one vertical edge of the opening 24' and is extended around the closed portion of the valve casing to the opposite vertical edge of the opening where the rib branches off tangentially toward the side of the recess forming the chamber 19. thus forming a semicircular passage in and around the chamber for the purpose of insuring the thorough heating of the air and oil injected into the chamber and the complete conversion thereof into a rich gaseous mixture before being forced into the power cylinder.

The valve 23 is operated by a lever 23" which is pivoted intermediate its ends to a bracket extending from the cylinder head 18 and the outer end of the lever is connected by a connecting rod 24" which is engaged by an operating cam 25' carried by the crank-shaft 3. The head 18 is formed with an air inlet port 18' that extends into the mixing chamber 19 and its outer end communicates with a compressed air receiving chamber 19' that is secured to the head 18 and is connected to the pipe 16 of the air pump 15. An inwardly opening spring seated valve controls the passage between the pipe 16 and the air chamber 19', and a spring seated valve 23ˣ controls the passage through the port 18', the valve 23ˣ being operatively connected to the lever 23" by means of a lever 23ˣˣ whereby the valves 23 and 23ˣ are opened simultaneously.

27 designates the fuel injector of the engine which is connected to the head of the engine in any suitable manner. The rectangular base or casing 27' of the injector is formed with a cylindrical bore 28, that forms an air chamber, and with a similar bore 29 of smaller diameter than the bore 28, that forms an oil chamber, the latter chamber being connected to the air chamber 28 by an angular passage 30 that is controlled by a needle valve 31 extending upwardly through the base 27'.

32 designates an air inlet passage leading into the air chamber 28 to the outer end of which is connected an air supply pipe 33 that extends from a suitable high compression pump (not shown) which may be geared to the power shaft of the engine or may be run by separate operating means as desired, and by which air under high pressure is forced into the air chamber 28. The air passage is controlled by a needle valve 34 that extends downwardly through the top of the base 27'. Fuel oil is led into the oil chamber 29 through a passage 35 which is controlled by a needle valve 36 arranged adjacent to the valve 34 and also extended down through the top of the base, and to the outer end of this passage is connected a pipe 37 that extends from a suitable source of supply which may be a tank (not shown) when it is convenient to lead the oil into the chamber by gravity, but which may be a suitable force pump (not shown) as desired.

37' designates an overflow passage leading from the top of the chamber 29 to provide a vent for the chamber to insure the filling thereof at each opening of the valve 36. The passage 37' is connected by an off-take pipe 38 that extends to a suitable receiving tank (not shown) and a needle valve 39 controls the overflow passage and is also extended down through the top of the base adjacent to and is operated simultaneously with the valve 36 as will be hereinafter explained.

Directly opposite the inner end of the passage 30 is an outlet 40 leading from the oil chamber 29 and connecting with an angular passage 41 that extends through the base and through a nipple 42 formed integral with said base, and communicating with a port 43 formed in the cylinder head that communicates with the mixing chamber or furnace 19. The outer end of the port 43 is enlarged to receive the nipple 42 which is held therein in an air-tight manner. The outlet 40 is controlled by a valve 44 that extends upwardly through the base 27' and the stem of the valve immediately below the upper end or head is reduced in diameter to provide an annular recess 45 with which the outlet passage 41 communicates. An air conducting pipe 46 is held in the lower end of the air passage 30 and forms a continuation thereof and is projected through the oil chamber 29 and extended into the outlet 40 so that when the air passage 30 and the outlet 40 are opened the oil in the oil chamber will be withdrawn from said chamber by and along with the escaping air and the oil thus sprayed into the mixing chamber 19 in a thoroughly disintegrated condition as from an atomizer. In order to permit the ready escape of the oil from the oil chamber 29 when the valves 39 and 44 are opened I provide the pipe 46, immediately adjacent to the top of the chamber 29, with an aperture 46' to permit the escape into the said chamber of a small quantity of the compressed air passing through the pipe thus avoiding the creation of a vacuum within the chamber as the oil is being withdrawn therefrom.

The stems of all of the aforesaid valves operate in short sleeves or casings 47 connected to or formed with the base and through caps 48 closing the outer ends of said casings.

The valves 34, 46 and 39 are operated by a single lever 49 which is pivotally held at one end between two ears 50' extending inwardly from the upper end of a bracket arm 50 that is secured to one end of the base 27' and the inner end of the lever is formed with a downwardly projecting forked extension 51 in which is journaled an idle roller 52 that operates through an opening or slot 50ˣ in the upper end of the bracket arm 50 and in a cam groove 52' formed in the upper inner side of a vertically movable cam rod 53 slidingly retained in a guide slot 54 formed in the outer vertical face of the bracket arm 50 so that as the cam rod 53 is moved downwardly the cam surface of the groove 52' will engage the idle roller 52 and elevate the outer end of the lever 49 to simultaneously open the valves 36 and 39 to permit the refilling of the oil chamber, and also the valve 34 to permit the recharging of the air chamber 28.

As shown the lever 49 is provided with laterally extending pins that are projected through slots formed in the stems of the valves 34, 36 and 39 so that when the outer end of the lever is elevated the valves will be lifted from their seats and in order to insure the tight seating of the valves I make the slots in the stems of the valves 34 and 36 slightly larger in diameter than the pins extending from the lever and extend the stems of these valves upwardly through a guide plate 34', which is arranged above the top of the base 27' and supported by studs extending from said base, and surround the stems with expansion springs 36' which are interposed between the lower side of the guide plate and collars formed on said stems so that the valves will be positively and closely seated the moment the lever is lowered.

To inwardly extending ears formed on the lower end of the bracket arm 50 are pivoted the inner ends of two levers 55 and 56 to which are connected the stems of the valves 31 and 44 respectively, that control the admission of the air and the fuel oil to the mixing chamber 19. The outer ends of the levers 55 and 56 are connected to the outer end of the lever 49 by means of a spring 49ˣ whose function is to draw the outer ends of the levers together and thus hold the valves to their seats, the levers 55 and 56 being connected by a cross bar 55' to which the spring is connected and this bar has its ends held in rocking bearings carried by the said levers so as to allow for a slight independent movement of said levers to insure the positive seating of the valves 31 and 44 when the levers are released from their operating devices which I will now describe.

The inner ends of the levers 55 and 56 are formed with extensions 57 which rest upon the outer wedge-shape tines of a forked arm 58 which in turn are held in the path of and adapted to be engaged by contacting blocks 58' carried by and at the lower end of the cam bar 53. The outer end of the arm 58 is pivoted to the upper end of a rocking lever 60 that is pivoted intermediate its ends to the side of the power cylinder and the wedge-shape members of the arm are held into contact with the inner ends of the levers 55 and 56 by means of a spring 61 which is connected to the extreme outer end of the arm 58 and to the lever 60 which constantly draws the outer end of the arm downwardly and elevates the opposite end to hold the wedge-shape members into engagement with the inner ends of the levers 55 and 56. The lever 60 and consequently the arm 58 are held in their adjusted positions by a locking dog 62 carried at the handle end of the lever 60 and which engages a rack bar 62' secured to the cylinder 1. The purpose of interposing a wedge-shape contacting member between the contacting blocks and the inner ends of the levers 55 and 56 is to permit the introduction of the oil and the air into the mixing chamber 19 of the power cylinder at different points or degrees of the cycle of the power piston and it will be readily apparent that if the lever 60 is adjusted so that the widest portions of the wedge-shape members will rest against the inner ends of the levers 55 and 56 the latter will be operated at an earlier point on the upstroke of the cam rod 53 than if a narrower portion of the members were adjusted in the path of the blocks thus opening the valves 31 and 44 to permit the introduction of the fuel into the mixing chamber or furnace immediately after the beginning of the power stroke of the piston or when the piston has traveled about 5 degrees of its cycle. The upper end of the lever 60 is pointed to form an index finger which operates over a dial plate 63 upon which is indicated the first thirty degrees of the cycle of the piston whereby it may be readily ascertained at what point or degree of the stroke of the piston the fuel is being admitted into mixing chamber or furnace 19.

Connected to the lower end of the cam bar 53 and forming a continuation thereof, is a rod 64 to the lower end of which is connected the outer end of a lever 65 carried by a rock shaft 66 that is journaled in brackets, secured to the base 2 and to the opposite end of the rock shaft 66 is held a lever arm 67 to the free end of which is pivoted a connecting rod 68 whose opposite end is pivotally connected to the upper end of a lever 69 that is pivoted to the side of the base 2 in position to be engaged by a double cam surface disk 70 carried by the crank-shaft 3. The rod 64 and its operated parts are held in one position by an expansion spring 64' that surrounds the rod and bears between a guide bracket 64" and a collar held on said rod as shown.

Extending from the outer end of the air chamber 28 is a cylindrical casing 71 that forms an extension of the chamber and fitted within this casing and in said chamber is a plunger piston 72 having a threaded stem 73 that works through a threaded collar formed on the outer end of the casing. The outer end of the stem is squared to receive a wrench or operating wheel for revolving the stem and its piston to move the latter in or out in the chamber 28 to vary the size of the latter and consequently regulate the amount of compressed air to be let into the mixing chamber or furnace 19. A cylindrical casing 74 also forms an extension of the oil chamber 29 and operating in this casing and in said chamber 29 is a plunger piston 75 that has its outer end connected to the free end of a lever 76 carried at the upper end of a rock-shaft 77 whose opposite or lower end is operatively connected to the disk 80 of a suitable governor operated by the fly-wheel of the engine. By thus connecting the plunger piston 75 it will be readily apparent that the size of the oil chamber is automatically regulated to vary the quantity of oil let into the mixing chamber or furnace according to the speed of the engine or the load under which it is working.

In Figs. 23 to 28, both inclusive, I show a slightly different form of fuel injector, and one that is particularly adapted for use with a single cylinder engine, in which the air chamber 28 of the first described form is omitted and the compressed air is led direct from the air supply through the chamber 29 to the injector. Referring to Figs. 23 to 28, 100 designates the base of the injector which is provided with a horizontally arranged cylindrical bore 101 that forms an oil chamber in which is fitted a plunger piston of similar construction and operation to that described with respect to the plunger piston 75. Extending upwardly through the base and leading into the oil chamber is an oil feed passage 102 to the outer end of which is connected an oil feed pipe 103 that extends from any suitable source of oil supply (not shown). Leading from the chamber 101 is an overflow passage 105 to the outer end of which is connected an off-take pipe 106 that empties into a suitable receiving tank (not shown). Needle valves 107 and 108, respectively, control the passages through the oil inlet 102 and the oil overflow passage 105. The stems of the valves are extended through one side of the base and have their extended portions provided with flanged collars 107' that are engaged by operating levers 109 carried by a sleeve 110 that is journaled between parallel arms 111 extending from the adjacent side of the base and the valves are normally held to their seats by springs 112 that surround the outer ends of the valve stems and which are interposed between the said flanged collars and the outer ends of the said arms 111 which latter also serve as guides for the outer ends of the valve stems. 113 designates an outlet leading from the oil chamber into the mixing chamber of the power cylinder through a port 114 formed in the cylinder head. Opposite the outlet 113 and in vertical alinement therewith is an air inlet port or passage 115 in the lower end of which is held the upper end of a short pipe section 116 which extends across the oil chamber 101 and has its lower end projected into the upper end of the outlet 113. The pipe 116 is formed with a small opening 117 to permit a small quantity of air to enter the oil chamber when the oil is withdrawn, and to the outer end of the port or passage 115 is connected a compressed air supply pipe 118 that extends from a suitable compressed air supply (not shown). Needle valves 119 and 120 control the outlet 113 and the air inlet port 115, respectively, and the stems of these valves are extended through the side of the base opposite to the valve stems 107 and 108 and the said valves 119 and 120 have their stems provided with collars 121 that are formed with grooves to receive the outer ends of operating lever arms 122 that are carried by a sleeve 123 journaled between parallel arms extending from the end of the base through which the stems of the valves 119 and 120 protrude and like the valves 107 and 108 the valves 119 and 120 are normally held to their seats by springs 125 as shown. The sleeves 110 and 123 are formed with outwardly extending levers 126 which are connected by a connecting rod 127 to one end of which is connected a lever 128 extending from a rock shaft 129 that is operated by a cam similar to that shown in the first construction of injector described. The oil chamber 101 is also provided with a plunger piston for regulating the size of the chamber which is of substantially the same construction and operation as the plunger piston working in the oil chamber 29 of the injector 27 and a further description of its construction and operation is thought unnecessary.

From the foregoing it will be clearly seen that the injector shown in Figs. 23 to 28 is of substantially the same construction and operation as the injector 27 and a more detailed description of its construction is thought unnecessary.

The operation of the engine is as follows: Assuming the engine to be running and that the divisional plate 20 has become hot from the previous explosions in the cylinder and also that a charge of fuel has just been ignited to drive the piston on its power stroke. As the piston begins its power stroke and the crank-shaft is revolved the cam 70 will operate the lever 69 to lift the cam bar 53 and cause the contacting blocks 59 to engage the undersides of the wedge-shape members of the arm 58 which in turn lift the inner ends of the levers 55 and 56 and lower their outer ends to open the valves 31 and 44 which allows the compressed air to escape through the outlet 40 which draws the oil from the oil chamber 29 and sprays it in a thoroughly disintegrated condition into the mixing chamber or furnace 19 and onto the plate 20 where the oil is heated and converted into a vapor and mixed with the air to form a rich gaseous mixture and where the mixture is held until the piston is on its return stroke. Upon a further movement of the cam 70 the lever will be released when the spring 64' will force the cam bar 53 downwardly, allowing the valves 31 and 44 to be reseated, and upon a further movement of the cam the lever 69 will engage a recess $x$ in the cam which permits a slightly further downward movement of the cam bar so as to bring the cam surface of the slot 52' in the cam rod to engage the roller carried by the lever 49 and thus lift the outer end of the lever to open the valves 34, 36 and 39 to recharge the air chamber 28 and the oil chamber 29, then when the cam is further revolved the cam bar will be again partially elevated to allow the valves 34, 36 and 39 to be reseated. Now during part of the power stroke of the piston air will be forced into the base 2 by the pump or blower 15 and as the piston nears the end of its power stroke the inlet port from the blower will be cut off by the lower end of the piston when the latter slightly compresses the air in the base 2. Now when the piston reaches the end of its stroke the exhaust ports 6 will be first uncovered by the upper end of the piston which allows the escape of the products and then the air that has been compressed in the base will escape into the cylinder through the ports 9 in the cylinder walls and through the passages in the piston which drives out all of the remaining particles of combustion and replenishes the cylinder with fresh clean air. After the communication between the air pump 15 and the base 2 has been cut off the air from the pump will be forced into the chamber 19' and into the mixing chamber or furnace 19 where it is highly heated and mixed with the rich gas in said chamber or furnace, then upon a further return movement of the piston and before the pressure in the cylinder exceeds that in the chamber 19, the valves 19$^x$ and 23 will be opened by the operating cam 25' when the gas in the chamber 19 will be forced into the power cylinder by the compressed air in the chamber 19' where the gas and the air in the cylinder will be compressed during the return stroke of the piston and converted into a combustible mixture by the time the piston reaches the end of its stroke. Thereupon the mixture is instantly ignited by the heat of the plate 20 and the compression within the cylinder to drive the piston on its next power stroke.

From the foregoing it will be seen that I provide an exceedingly simple and highly efficient engine whose principle may be carried out with equal efficiency either with the low pressure engine or with the high pressure engine as it will be understood that it is only necessary to increase the pressure of the air for forcing the fuel oil into the mixing chamber or furnace and into the cylinder when the injector is used in connection with high pressure engines. It may be stated here that when the injector is used in multiple cylinder engines I propose to use the construction shown with the air chamber 28 as it requires only one compression pump to furnish the compressed air to all of the injectors whereas with a single cylinder engine the air used for forcing the oil into the mixing chamber may be supplied direct from the pump and the air chamber 28 thus dispensed with. I desire it understood that I do not limit myself to the details of construction shown or to the arrangement of the several parts of the engine as slight modifications or alterations may be made without departing from the spirit of the invention.

For the convenience in starting the engine I may employ a sparking plug 99, Fig. 3, for igniting the initial charges of fuel in the cylinder and until the plate 20 becomes hot after which the plug may be "cut out" and the fuel then ignited by the heat of the plate and the compression within the cylinder.

What I claim is:—

1. An internal combustion engine, comprising a power cylinder having an exhaust port and an air inlet port in the power end thereof, an air-tight base upon which the cylinder is mounted communicating with said air inlet port, a power piston working in said cylinder, a crank-shaft mounted in said base, a connecting rod connecting said piston and crank-shaft, a mixing chamber at one end of said power cylinder and communicating therewith, a valve controlling the communication, means for injecting fuel oil and air into said mixing chamber wherein the oil and air are converted into a gas by the heat of said chamber, and a common means for supplying air to said base to be used for scavenging the power cylinder of the products of combustion and for supplying air under pressure to said mixing chamber to force the gas therein into said power cylinder when the valve controlling the communication between said cylinder and said mixing chamber is open.

2. An internal combustion engine, comprising a power cylinder having an exhaust port and an air inlet port, a power piston working in said power cylinder, an air-tight base upon which the cylinder is mounted, a crank-shaft mounted in said base, a connecting rod connecting said power piston and crank-shaft, a passage connecting the base and the said air inlet port, a head having a recess in its lower side mounted upon said cylinder, a plate arranged between said cylinder and head to provide a chamber in the head, a valve controlled opening in said plate leading into said cylinder, an injector for supplying fuel oil and air to said chamber wherein the oil and air are converted into gas by the heat of said chamber, and a common means for supplying air to said base and to said chamber, for the purposes specified.

3. An internal combustion engine, comprising a power cylinder, a piston working therein, a base upon which the cylinder is mounted, a crank-shaft, a connecting rod connecting the piston and crank-shaft, a head having a recess in its lower side mounted upon the cylinder, a divisional plate arranged between the cylinder and head providing a chamber in said head, a valve controlled opening in said plate leading into said cylinder, an injector for forcing oil and air into said chamber against said plate and wherein the oil and air are converted into gas by the heat of said plate, means for opening said valve, and means for supplying air under pressure to said chamber to force the gas therein into said power cylinder when said valve is open.

4. An internal combustion engine, comprising a power cylinder, a power piston working therein, a base upon which the cylinder is mounted, a crank-shaft, a connecting rod connecting the piston and crank-shaft, a head for said cylinder having a recess in its lower side, a plate arranged between the cylinder and head forming a chamber in said head, a valve controlled opening in said plate, a rib formed upon said plate extending partly around said valve opening and having one end extended to the side of the recess to provide a semi-circular passage in said chamber, an injector for spraying oil and air into said semi-circular passage in said chamber wherein the oil and air are converted into gas, means for opening the valve in said plate, means for forcing air under pressure into said chamber to force the gas therefrom into the power cylinder, and means controlling the inlet of air to said chamber.

5. An internal combustion engine, comprising a power cylinder having exhaust ports and air inlet ports in the walls thereof, an air-tight base upon which the cylinder is mounted, a passage connecting the base and said air inlet ports, a piston working in said cylinder controlling said ports, a crank-shaft mounted in the base, a connecting rod connecting the piston and shaft, a head mounted upon the cylinder having a recess in its lower side, a divisional plate arranged between the cylinder and head to provide a fuel mixing chamber at the end of the cylinder, a valve controlled opening in said plate, an injector for forcing oil and air into said fuel mixing chamber wherein the oil and air are converted into gas as specified, valves controlling the admission of the oil and air into said chamber, a pump for forcing scavenging air into said base and for supplying air under pressure to said fuel mixing chamber to drive the gases therefrom into said power cylinder, and means controlling the admission of air into said fuel mixing chamber.

6. In an internal combustion engine, a power cylinder, an air-tight base upon which the cylinder is mounted, means for effecting communication between said base and the power end of said cylinder, an air inlet near the lower end of said cylinder, an air pump connected to said air inlet for forcing scavenging air into said base, a piston working in said cylinder controlling the communication between said base and the power end of the cylinder and the said air inlet, whereby the air that is forced into the base is compressed before it is admitted to said power cylinder, as specified, and means for admitting fuel to said power cylinder.

7. In combination with an internal combustion engine having an air-tight base, a valved air inlet in said base through which air is drawn into the base by and on the return stroke of the piston working in the cylinder and which air is admitted into the cylinder to scavenger it of the products of combustion, of a pump for forcing air into the base through a port arranged in the wall of the cylinder whereby a greater quantity of scavenging air is provided than can be drawn into the base by the vacuum created in said base by the return stroke of the power piston, said port being so located in the wall of the cylinder to be covered by the power piston when it nears the end of its power stroke thereby cutting off the communication between the pump and the base of the engine to permit of a slight compression of the air pumped into the base before being admitted into the cylinder.

8. An internal combustion engine, comprising a power cylinder having exhaust ports and air inlet ports, an air-tight base upon which the cylinder is mounted communicating with said air inlet ports, a power piston working in said cylinder, a crank-shaft mounted in the base, a connecting rod connecting the shaft and piston, a mixing chamber communicating with the cylinder, an injector for forcing fuel oil and air into said mixing chamber wherein the oil and air are converted into a gas, and a pump for supplying air to the base of the engine and for forcing the gas from said mixing chamber into said power cylinder.

9. An internal combustion engine, comprising a power cylinder, a power piston working therein, a base upon which the cylinder is mounted, a crank-shaft operatively connected to said piston, a mixing chamber communicating with said power cylinder, means to control said communication whereby said mixing chamber is cut off from said power cylinder during the power stroke of said piston, an injector having an oil chamber communicating with said mixing chamber, a valve controlling the communication between said oil chamber and said mixing chamber, an air passage in communication with said oil chamber and a valve for controlling said passage, means to supply oil to said oil chamber, and means to supply air under pressure to said oil chamber to force the oil therefrom into said mixing chamber wherein the oil and air are converted into gas, as specified.

10. An internal combustion engine, comprising a power cylinder, a power piston working therein, a base upon which the cylinder is mounted, a crank-shaft mounted in said base and connected to said piston, a head mounted upon said cylinder having a recess in its lower side, a plate arranged between the upper end of the piston and said head providing a mixing chamber at the upper end of the cylinder and having an opening which establishes communication between said cylinder and said mixing chamber, a valve for the opening whereby communication between the cylinder and the mixing chamber is cut off during the power stroke of said piston, an injector having an oil chamber and an outlet leading from said chamber to said mixing chamber, a valve controlling said outlet, an oil supply for said oil chamber, and means to supply air under pressure to said oil chamber to withdraw the oil therefrom and spray it into said mixing chamber.

11. An internal combustion engine, comprising a power cylinder, a power piston working therein, a base upon which the cylinder is mounted, a crank-shaft mounted in the base, a connecting rod connecting the piston and shaft, a head mounted upon the cylinder having a recess in its lower side, a plate arranged between the upper end of the cylinder and the plate providing a fuel mixing chamber within the head, said plate having an opening that establishes communication between the power end of the cylinder and the said chamber, a valve for the opening, an injector having an oil chamber and an outlet leading from said chamber to said fuel mixing chamber, a fuel oil inlet leading to said chamber, means to supply oil to said inlet, an air passage leading into said oil chamber, a pipe extending from the said passage into the mouth of the outlet, means for conducting air under pressure to said air passage, and means for controlling the passage of air through said air passage.

12. An internal combustion engine, comprising a power cylinder, a power piston working therein, a base upon which the cylinder is mounted, a crank-shaft mounted in the base, a connecting rod connecting the piston and crank-shaft, a fuel mixing chamber communicating with the power cylinder, means to control the communication, an injector having an oil chamber and an outlet communicating with said fuel mixing chamber, means to supply fuel oil to said oil chamber, an air passage extending into said oil chamber, a pipe extending from the inner end of said passage through said oil chamber and having its end extending into said outlet, means to supply compressed air to said air passage, means to control said air supply, and means for supplying air under pressure to force the fuel from said fuel mixing chamber into said cylinder.

13. An internal combustion engine, comprising a power cylinder, a power piston working therein, an air-tight base upon which the cylinder is mounted and with which it communicates, a crank-shaft mounted in said base, a connecting rod connecting the power piston and crank-shaft, a fuel mixing chamber communicating with the power cylinder, an injector having an oil chamber and an outlet leading from said oil chamber to said fuel mixing chamber, an air passage leading to said oil chamber, a pipe extending from the inner end of said passage through said oil chamber and having its lower end extended into the outlet leading from said chamber, means to supply air under pressure to said air passage to withdraw the oil from said oil chamber and force it into said fuel mixing chamber wherein the oil and air are converted into gas, as specified, means to control the inlet of air to said oil chamber, and a common means for supplying air to said airtight base, for the purposes specified, and for supplying air to said fuel mixing chamber to force the gas therefrom into said power cylinder.

14. An internal combustion engine, comprising a power cylinder, a power piston working therein, a base, upon which the cylinder is mounted, a crank-shaft mounted in the base, a connecting rod connecting the piston and crank-shaft, a fuel mixing chamber communicating with the power cylinder, means to control the communication, an injector having an oil chamber and a compressed air receiving chamber communicating with said oil chamber, a valve controlling the communication between said oil and air chambers, said oil chamber having an outlet that communicates with said fuel mixing chamber, a valve controlling said outlet, means to supply oil to said oil chamber, means to control the inlet to said oil chamber, means to supply air under pressure to said air receiving chamber, a valve controlling the admission of compressed air to said air receiving chamber, and means for supplying air under pressure to said fuel mixing chamber to force the fuel therefrom into said power cylinder.

15. An internal combustion engine, comprising a power cylinder having a fuel mixing chamber in the head thereof, a power piston working in said cylinder, a base, a crank-shaft mounted in the base, a connecting rod connecting the piston and crank-shaft, an injector having an oil chamber that communicates with said fuel mixing chamber and a compressed air receiving chamber communicating with said oil chamber and a valve controlling said communication, valve controlled supply passages leading to the oil and air receiving chambers, a valve controlled outlet leading from said oil chamber communicating with said fuel mixing chamber, a valve controlled overflow leading from said oil chamber, means operatively connected with the crank-shaft of the engine for operating all of said valves, and means for supplying air to said fuel mixing chamber to force the fuel therefrom into said power cylinder.

16. An internal combustion engine, comprising a power cylinder having a fuel mixing chamber in the head thereof, a power piston working in said cylinder, a base, a crank-shaft mounted therein, a connecting rod connecting said piston and shaft, means adapted to spray fuel oil and air into said fuel mixing chamber wherein the oil and air are converted into gas, means controlling the admission of the gas into the power cylinder, means to supply air under pressure to force the gas from said fuel mixing chamber into said power cylinder wherein the gas is mixed with the air in said cylinder and wherein the mixture is ignited when compressed to ignition temperature, and means to supply scavenging air to said power cylinder.

17. An internal combustion engine, comprising a power cylinder, a fuel mixing chamber communicating therewith, a valve controlling said communication, a power piston working in said cylinder, a base, a crank-shaft mounted in said base, a connecting rod connecting said piston and crank-shaft, an injector for spraying fuel oil and air into said fuel mixing chamber wherein the oil and air are converted into a rich gas, means to supply air under pressure to force the gas from said mixing chamber into said power cylinder wherein the gas and air are converted into a combustible mixture which is ignited when compressed to ignition temperature by the power piston, means to supply fuel oil and means to supply air under pressure to said injector, valves controlling the admission of the oil and air into and from said injector, and means to supply scavenging air to said power cylinder on each stroke of the power piston.

18. An internal combustion engine, comprising a power cylinder, a fuel mixing chamber communicating therewith, a valve controlling said communication, a power piston working in said cylinder, a base, a crank-shaft mounted in said base, a connecting rod connecting said piston and crank-shaft, an injector adapted for spraying fuel oil and air into said mixing chamber wherein the oil and air are converted into a rich gas, means for forcing air under pressure into said mixing chamber to force the gas therefrom into said power cylinder, and wherein the gas and air are converted into a combustible mixture which is ignited when compressed to ignition temperature, means to supply fuel oil and means to supply air under pressure to said injector, means controlling the admission of the oil and the air to said injector, means controlling the admission of the oil and air into said mixing chamber, and means to supply scavenging air to said power cylinder.

19. An internal combustion engine, comprising a power cylinder having exhaust ports and air inlet ports in the walls thereof, an air-tight base upon which the cylinder is mounted, a passage connecting said base and said air inlet ports, a power piston working in said cylinder controlling said ports, a crank-shaft mounted in said base, a connecting rod connecting the piston and crank-shaft, a fuel mixing chamber communicating with said power cylinder, an injector for forcing oil and air into said fuel mixing chamber wherein the oil and air are converted into a rich gas, means to supply oil and air under pressure to said injector, means controlling the inlet of the oil and air into the injector, means controlling the inlet of the oil and air from the injector to said mixing chamber, a pump for forcing air into said base, for the purpose specified, and for supplying air under pressure to said fuel mixing chamber to drive the gas therefrom into said power cylinder wherein the gas and air are mixed with the air in said power cylinder and converted into a combustible mixture which is ignited when compressed to ignition temperature, and means for controlling the admission of the air and gas from said mixing chamber to said power cylinder.

20. An internal combustion engine, comprising a power cylinder, a power piston working therein, a base, a crank-shaft mounted in said base, a connecting rod connecting the piston and crank-shaft, a fuel mixing chamber communicating with said power cylinder, an injector adapted for forcing fuel oil and air into said fuel mixing chamber wherein the oil and air are converted into gas, said injector having an oil chamber and an air chamber, a valve controlled passage connecting said chambers, a valve controlled outlet leading from said oil chamber into said fuel mixing chamber, means to supply oil and means to supply air under pressure to the respective chambers, valves controlling the inlets to said chambers, an overflow passage leading from said oil chamber, means for operating said valves as and for the purposes specified, and means for supplying air under pressure to said mixing chamber to force the gas therefrom into said power cylinder.

21. An internal combustion engine, comprising a power cylinder having exhaust ports and air inlet ports in the walls thereof, a power piston working in said cylinder and controlling said ports, an air-tight base upon which the cylinder is mounted, channels connecting said base with said air inlet ports, a crank-shaft mounted in said base, a connecting rod connecting said piston and crank-shaft, a head arranged upon the cylinder having a recess in its lower side, a plate arranged between the upper end of said cylinder and the head providing a fuel mixing chamber within said head, an injector for forcing fuel oil and air into said fuel mixing chamber wherein the oil and air are converted into gas, said injector comprising a casing having an air chamber and an oil chamber therein, a valve controlled passage connecting said chambers, an outlet extending from said oil chamber leading to said fuel mixing chamber, a valve controlling said outlet, a pipe extending from the outlet of the passage arranged between said air and said oil chamber having its opposite end extended into said outlet from said oil chamber, said pipe having an opening therein adjacent to the top of said oil chamber, a valve controlled overflow passage leading from said oil chamber, valve controlled passages leading into said oil and air chambers, means to supply fuel oil to the passage leading into said oil chamber, and means to supply air under pressure to the passage leading into said air chamber, means operatively connected to the crank-shaft of the engine for operating all of said valves, as and for the purposes specified, and an air pump operatively connected to said crank-shaft for forcing air into said air-tight base and for supplying air under pressure to said mixing chamber to force the gas therefrom into said power cylinder.

22. An internal combustion engine, comprising a power cylinder, a power piston working therein, a base, a crank-shaft mounted in said base, a connecting rod connecting the piston and crank-shaft, a fuel mixing chamber communicating with said power-cylinder, an injector adapted for spraying oil and air into said mixing chamber wherein the oil and air are converted into gas, said injector having an oil chamber and an air chamber, a valve controlled passage connecting said chambers, a valve controlled passage leading from said oil chamber into said fuel mixing chamber, means to supply oil and means to supply air under pressure to the respective chambers, valves controlling the inlets to said chambers, an overflow passage leading from said oil chamber, means operatively connected to said crank-shaft for operating all of said valves, means for regulating the operation of the valves controlling the passage between said oil and air chambers and the outlet leading from said oil chamber whereby the oil and air may be injected into said fuel mixing chamber at different points on the stroke of the power piston, and means for supplying air under pressure to said fuel mixing chamber to drive the gases therefrom into said power cylinder.

23. A fuel injector for internal combustion engines, comprising a casing having an air chamber and an oil chamber, a valve controlled passage connecting said chambers, a valve controlled outlet leading from said oil chamber, a valve controlled air passage leading to said air chamber, valve controlled oil inlet and overflow passages leading into and from said oil chamber, a pipe extending from the outlet end of the passage connecting said chambers through said oil chamber into said outlet, said pipe being of smaller diameter than said outlet and having an opening adjacent to the upper wall of said chamber, means to supply oil and means to supply air under pressure to the respective chambers, levers operatively connected to all of said valves, and means for operating said levers.

24. A fuel injector for internal combustion engines, comprising a casing having an oil chamber, a valve controlled oil inlet passage leading into and a valve controlled overflow passage leading from said chamber, a valve controlled outlet leading from said chamber, an air inlet passage, a pipe extending from said air inlet passage through said chamber and into said outlet, said pipe being of smaller diameter than said outlet and having an opening therein adjacent to the upper wall of said chamber whereby air is admitted into said chamber as it passes through said pipe, levers operatively connected to said valves, and means for operating said levers, means to supply oil to said chamber, and means to supply air under pressure to said air passage to withdraw the oil from said chamber when the valves controlling said air passage and said outlet are open.

In testimony whereof I have hereunto set my hand this 18th day of March, A. D. 1911.

SIMON LAKE.

Witnesses:
 THOS. E. LAKE,
 M. D. BLONDEL.